United States Patent [19]
Cowan

[11] Patent Number: 6,029,353
[45] Date of Patent: Feb. 29, 2000

[54] METHOD AND PRODUCTS PRODUCED FROM SPLITTING MULTI-VOID HOLLOW TUBING

[75] Inventor: Michael H. Cowan, Sherwood, Oreg.

[73] Assignee: Anodizing, Inc., Portland, Oreg.

[21] Appl. No.: 08/870,092

[22] Filed: Jun. 5, 1997

[51] Int. Cl.[7] .................................................. B23P 15/00
[52] U.S. Cl. ................................. 29/897.312; 29/897.2; 29/412; 29/417; 72/254
[58] Field of Search ........................... 29/897.2, 897.312, 29/412, 415, 417, 890.05, 890.038; 72/254, 256; 280/281.1

[56] References Cited

U.S. PATENT DOCUMENTS

| | | | |
|---|---|---|---|
| 2,999,304 | 9/1961 | Pauls | 29/890.05 |
| 3,314,151 | 4/1967 | Rubin . | |
| 3,839,975 | 10/1974 | Tranel | 29/890.038 |
| 4,007,538 | 2/1977 | Petrie . | |
| 4,203,311 | 5/1980 | O'Conor et al. . | |
| 4,330,919 | 5/1982 | Bischlipp et al. | 29/897.312 |
| 4,512,069 | 4/1985 | Hagemeister | 72/256 |
| 4,850,607 | 7/1989 | Trimble | 280/281.1 |
| 4,852,233 | 8/1989 | Kawase . | |
| 4,986,597 | 1/1991 | Clausen | 29/412 |
| 5,058,266 | 10/1991 | Knoll | 72/256 |
| 5,163,226 | 11/1992 | Phelps . | |
| 5,255,932 | 10/1993 | Moore | 280/281.1 |
| 5,271,784 | 12/1993 | Chen et al. | 280/281.1 |
| 5,368,804 | 11/1994 | Hwang et al. | 280/281.1 |
| 5,412,860 | 5/1995 | Miyauchi et al. . | |
| 5,513,432 | 5/1996 | Sasaki et al. | 29/890.038 |

FOREIGN PATENT DOCUMENTS

| | | | |
|---|---|---|---|
| 0727859 | 2/1966 | Canada | 29/890.05 |

*Primary Examiner*—Irene Cuda
*Assistant Examiner*—Trinh T. Nguyen
*Attorney, Agent, or Firm*—Robert L. Harrington

[57] ABSTRACT

A multi-void structural member is alterable to form separate yet integral strut members extending from the original member. The defined voids are joined by webs which are removed from any or all of the defined voids to form the integral strut members of a desired configuration. The defined voids may be joined to others or separated to an individual extending strut. The multi-void member or any of the integral strut members formed therefrom are formed to a desired configuration by conventional methods to provide an integral structural member of a desired configuration.

2 Claims, 2 Drawing Sheets

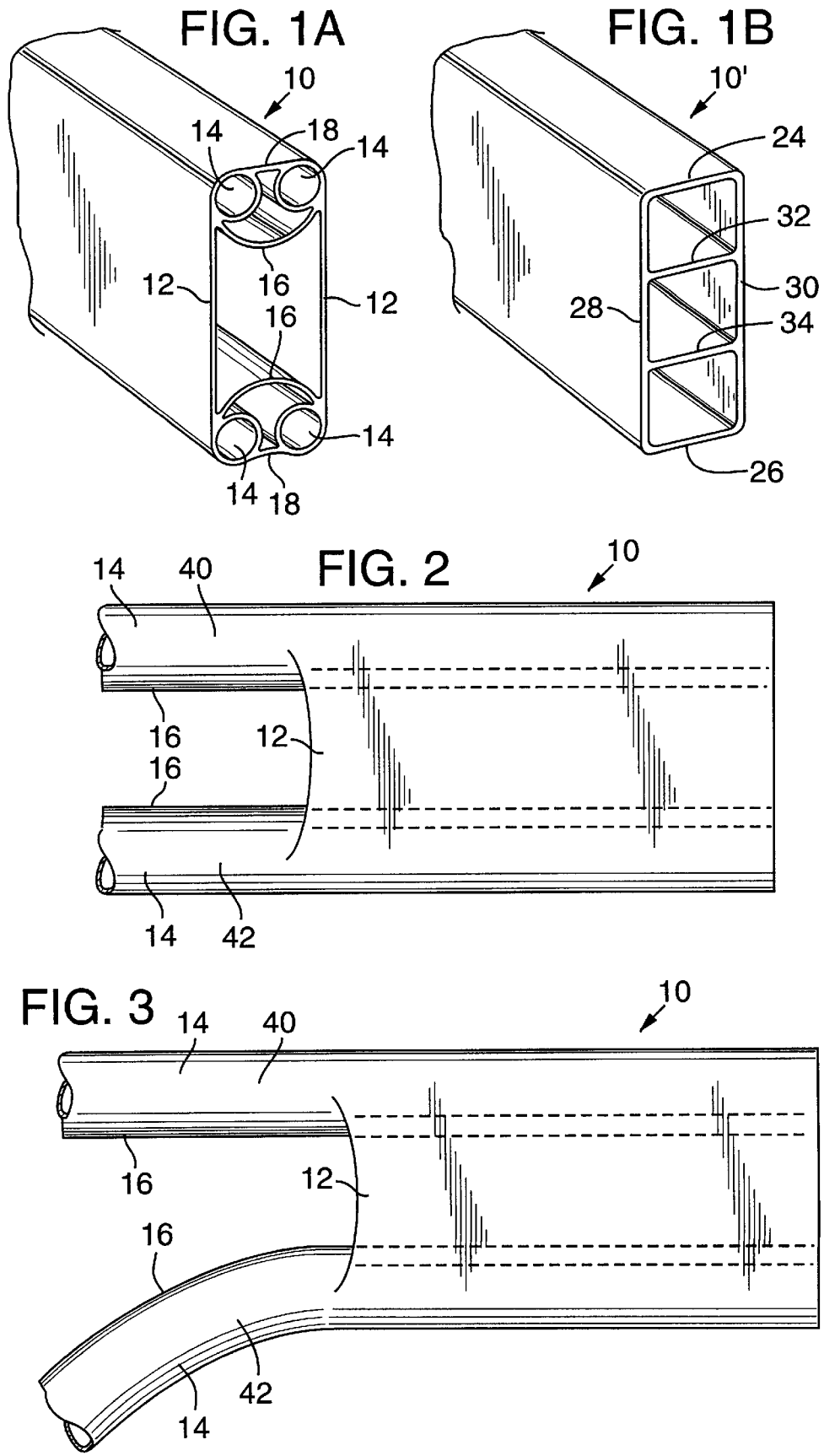

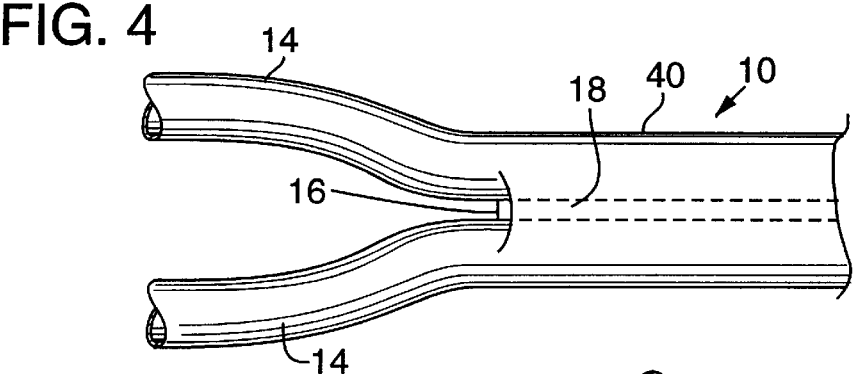
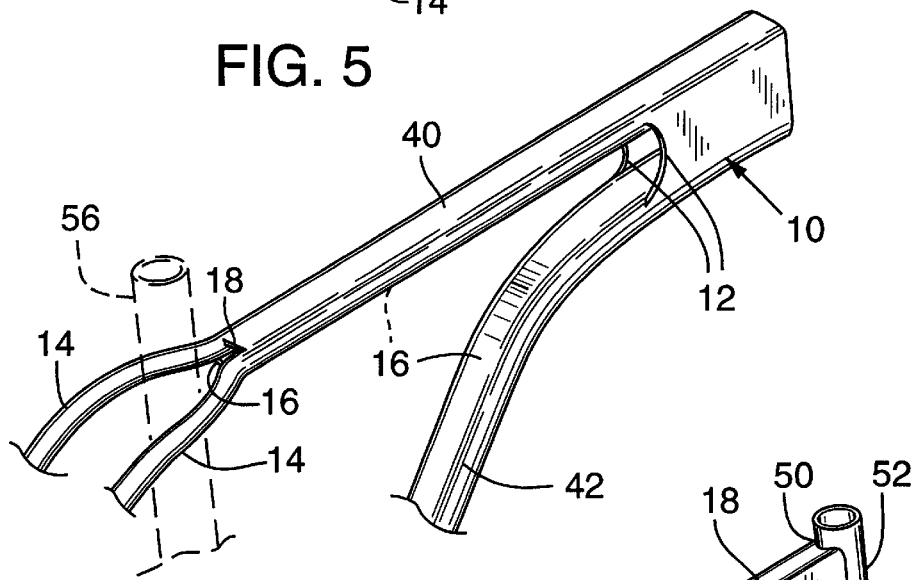
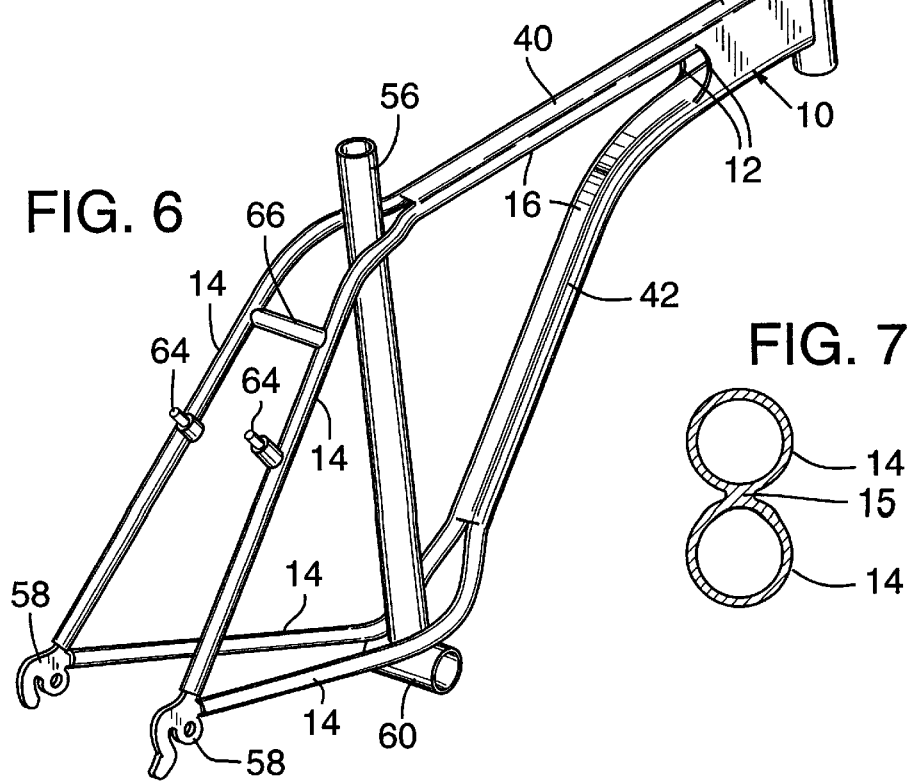
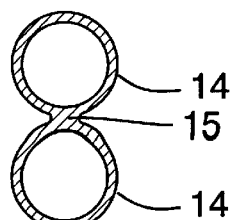

6,029,353

1

METHOD AND PRODUCTS PRODUCED FROM SPLITTING MULTI-VOID HOLLOW TUBING

FIELD OF THE INVENTION

This invention relates to the unitization or integration of tube structures having a plurality of tube components whereby a single extrusion of tubing is split into multiple branches that form the plurality of tube components.

BACKGROUND OF THE INVENTION

Tubing, e.g., aluminum tubing, is commonly used for producing apparatus or structures that need to be both strong and light weight. An example is a bicycle frame as follows: A center post supports a rider's seat at the top and pedals at the bottom. A pair of support tubes or struts extend from both the bottom and top of the center post to each side of a rear hub (the rear wheel residing between the tubes/struts of each pair), and a single tube or strut extended from the top and bottom of the center post to a steering tube (in which a steering post is rotatably supported and connected at the top end to handle bars and at the bottom end to the front wheel). In the above example there are six tube or strut components, each one welded to the center post. Each weld represents an added operation to the production of the frame and also a potential point of failure.

BRIEF DESCRIPTION OF THE INVENTION

The present invention can, for example, with reference to the above-described bicycle frame, reduce the number of independently produced tube components from six to one. A multi-void extrusion is extruded to have a specific length including four separate tube or tubular portions, each portion including a separate enclosure and the portions interconnected by webs. The multi-void extrusion extends intact for a first length that forms a support bar extending rearward from the steering tube. The two upper tube portions are then split away from the bottom two tube portions to form the pair of single struts, one running to the top of the center post and the other to the bottom of the center post. Just prior to the point where the tube portions join the center post, each of the two tube portions are split apart and pass around the center post (and affixed thereto, e.g., by welding) and continue toward the rear wheel hub. The same structure as previously described is thereby constructed but with all six tube components produced from the single multi-void extrusion. Splitting of the multi-void extrusion is more economically produced than is welding and furthermore provides improved strength and less opportunity for weld failures. Those skilled in the art will appreciate that the above is but one example of how the process can be developed e.g., to produce a bicycle frame. Other examples for other product types will become apparent upon reference to the detailed description and drawings which follow.

BRIEF DESCRIPTION OF THE DRAWINGS

FIGS. 1A and 1B illustrate examples of extruded structural members;

FIG. 2 is a view of the structural member of FIG. 1A with a portion of a side web cut away;

FIG. 3 is a view illustrating the shaping or forming of the structural member of FIG. 1A;

FIG. 4 is a view of the structural member of FIG. 1A showing another connecting web being cut away;

FIG. 5 is a view illustrating the shaping of individual components of the structural member of FIG. 1A;

2

FIG. 6 is a view of a bicycle frame fabricated utilizing the structural member of FIG. 1A; and FIG. 7 is a view of an alternate embodiment.

DESCRIPTION OF THE PREFERRED EMBODIMENT

FIGS. 1A and 1B illustrate two members that are formed by the process of extruding. There are many materials used in the extrusion process. One material that is frequently utilized is aluminum or an alloy thereof. The member of FIG. 1A is formed such that it has multiple voids formed along its length, that is, the voids are hollow and are configured by the side walls that define the shape of the voids. The member 10 of FIG. 1A has side webs 12 (walls) that are extended and formed with configured shapes at the top and the bottom of the member 10. In this embodiment, the member 10 is symmetrical, that is, the members formed at the top (as viewed in the figure) of the member 10 are a mirror of the members formed at the bottom of the member 10. As shown, the webs 12 are joined to tubular members 14 and to an arcuate web 16. Another web 18 extends across the tubular members 14 and is joined therewith. The tubular members 14 form voids along the length of the member 10. Additionally the side webs 12 and the arcuate webs 16 form another void along the length of the member 10 and an additional void is formed between the arcuate member 16, the web 18 and the tubular members 14. The member 10 thus has multiple voids extending along its length.

FIG. 1B illustrates another structural member 10' that is produced by the extruding process and as shown the structural member 10' has a top web 24 and a bottom web 26. Extending between the top and bottom webs 24, 26 are side webs 28 and 30. Voids are formed along the length of the member 10' by interior webs 32, 34 that are extended between the side webs 28 and 30 substantially as shown. FIGS. 1A and 1B are just two examples of the members that may be produced by the extruding process and the configuration of the members and the voids provided therein would be designed and fabricated to suit the requirements.

The extruded members 10 and 10' may be modified to create formed integral structural members and may further be joined together in different configurations, an example of which is explained in the preferred embodiment.

FIG. 2 illustrates the member of FIG. 1A being modified by removing the side webs 12 along a portion of the length of the member 10. This will separate the upper tubular portions 14 including upper web 18 and upper arcuate web 16, from the lower tubular portions 14 including lower web 18 and lower arcuate web 16. The separated members will hereafter be referred to as the top portion 40 and the lower portion 42. Each of the portions 40, 42 have tubular members 14 joined by the web 18 and the arcuate web 16. The top portion 40 and the lower portion 42 thus form two distinct structural members extending from the unaltered portion of the member 10. FIG. 3 illustrates the further alteration of the member 10 by the forming or bending of the lower portion 42 away from the upper portion 40. This embodiment of the lower portion 42 has an arcuate bend formed in a portion of its length extending from the unaltered portion of member 10 following removal of side web 12 of the member 10.

FIG. 4 illustrates a next alteration of the member 10 of FIG. 1. As shown (as if viewed looking down at the top of view 3 but further down the length thereof as illustrated in FIG. 5), the web 18 and the arcuate web 16 have been cut away from the tubular portions 14 and thus the tubular portions 14 extend from the portions 40. The tubular portions 14 may also be formed such as by bending as illustrated in FIG. 5 and thus the member 10 may be modified and formed to suit determined requirements of the end structure. It will be appreciated that the same alteration is made to portion 42 as best seen in FIG. 6.

With further reference to FIG. 6, the structural member 10 of FIG. 1A has been altered by machining and bending and/or known processes to form a bicycle frame. As shown, a portion of each of the side webs 12 have been removed from the structural member 10 such as by machining to leave only a short portion of the structural member 10 unaltered. An end 50 of the structural member 10 has been machined or formed in a conventional manner to accept a steering tube 52. Steering tube 52 is attached to the end 50 in a conventional manner such as by welding. The short unaltered portion of structure 10 is sometimes referred to as the steering support tube portion.

A top portion 40 and a lower portion 42 extend from the unaltered structural member 10. A lower portion 42 has been formed as by bending such that the lower portion 42 extends away from the upper portion 40. As previously explained, the upper portion 40 (sometimes referred to as the top tube portion) and the lower portion 42 (sometimes referred to as the down tube portion) are structural components resulting from the removal of the side webs 12 from the structural member 10. Each of the upper portions 40 and the lower portions 42 have tubular portions 14 joined by the web 18 and the arcuate web 16. In this embodiment, the upper portion 40 extends from the unaltered portion 10 of the structural member. The end of the upper portion 40 that is extended from the unaltered portion of the member 10 has had the web 18 and the arcuate web 16 removed as by machining (as illustrated in FIG. 4). Tubular portions 14 thus extend from the upper portion 40 and as shown in the figure, the tubular portions 14 are formed as by bending and are configured to receive a center support post (column) 56.

The tubular portions 14 of the upper portion 40 are further bent to extend downwardly with the ends of the tubular portions 14 being fixedly attached to brackets 58. These upper tubular portions 14 are sometimes referred to as seat stay tube portions. The end portion 42 has had the web 18 and the arcuate web 16 similarly removed exposing the tubular portions 14 of the lower portion 42. The tubular portions 14 of the lower portions 42 are further formed as by bending to receive the lower portion of the center post (column) 56 and are bent in a configuration to extend to the brackets 58 on which the tubular portions 14 of the end portions 40 are attached. These lower tubular portions 14 are sometimes referred to as chain stay tube portions.

Brackets 58 thus join the upper tubular portions 14 of the portion 40 and the lower tubular portions 14 of the lower portion 42. The brackets 58 are attached to the tubular portions 14 in a conventional manner such as by welding. The brackets 58 are configured to receive and support a rear wheel (not shown). The center post (column) 56 is of the conventional type and is attached to the tubular portions 14 as by welding. A post (column) 56 is arranged to support a seat above the upper portion 40 and a lower portion of the post (column) 56 has a housing 60 that will receive a conventional pedal crank assembly of a bicycle.

The structural member 10 thus has been formed and altered to create a structural member having a plurality of integrated strut components from a single unit. The only addition required is the steering tube 52, the center post (column) 56, the brackets 58 and some ancillary equipment such as brackets 64 for mounting the rear brake assembly and a support strut 66.

Those skilled in the art will recognize that modifications and variations may be made without departing from the true spirit and scope of the invention. Whereas the tubular portions 14 are illustrated as being circular cross section, square tubing or other closed cavity configurations are encompassed by the term "tube or tubular portion". Also, the web interconnection can be in different forms. See FIG. 7 where tubular portions 14 are joined by a web 15 that is the minimum of material required for joining the peripheries of the two walls but enabling two complete tube portions to be split apart.

The invention is therefore not to be limited to the embodiments described and illustrated but is to be determined from the appended claims.

I claim:

1. A method of producing a bicycle frame having an integral segment including a steering support tube portion, a top tube portion, a down tube portion, a pair of seat stay tube portions and a pair of chain stay tube portions, which method comprises:

extruding a multi-void tubular configuration as a steering support tube portion, said steering support tube portion including in its multi-void configuration a top tube portion and a down tube portion interconnected by first web portions that in part form an exterior configuration of the steering support tube portion, said top tube portion having a multi-void configuration including a pair of seat stay portions interconnected by second web portions that in part form the exterior configuration of the top tube portion, said down tube portion having a multi-void configuration including a pair of chain stay portions interconnected by third web portions that in part form the exterior configuration of the down tube portions;

extending said steering support tube portion to a first determined length and removing the first web portions to define said first determined length and to expose said top tube portion and said down tube portion;

extending and forming said top tube portion to a second determined length and extending and forming said down tube portion to a third determined length;

removing the second web portions of said top tube portion to define said second determined length and to expose said seat stay tube portions, and extending and forming said seat stay tube portions to a fourth determined length; and removing the third web portions of said down tube portion to define said third determined length and to expose said chain stay tube portions, and extending and forming said chain stay tube portions to a fourth determined length.

2. A method of producing an integral tubular structure which comprises:

extruding a multi-void tubular structure having a primary structural cross section and a primary exterior tubular configuration, said primary structural cross section including a pair of secondary structural cross sections having secondary exterior tubular configurations and interconnected by first web portions forming a part of the primary exterior tubular configuration, and at least one of said secondary structural cross sections including a pair of tertiary structural cross sections having tertiary exterior tubular configurations and interconnected by second web portions forming a part of the exterior tubular configuration of at least one of said secondary structural cross sections;

extending the primary structural cross section to a first determined length, removing the first web portions to define said first determined length and to expose said secondary structural cross sections;

extending and forming at least one of said secondary structural cross sections to a second determined length, removing the second web portions of at least one of said secondary structural cross sections to define said second determined length and to expose said tertiary structural cross sections; and extending and forming said tertiary structural cross sections into third and fourth determined lengths.

* * * * *